Patented Feb. 4, 1936

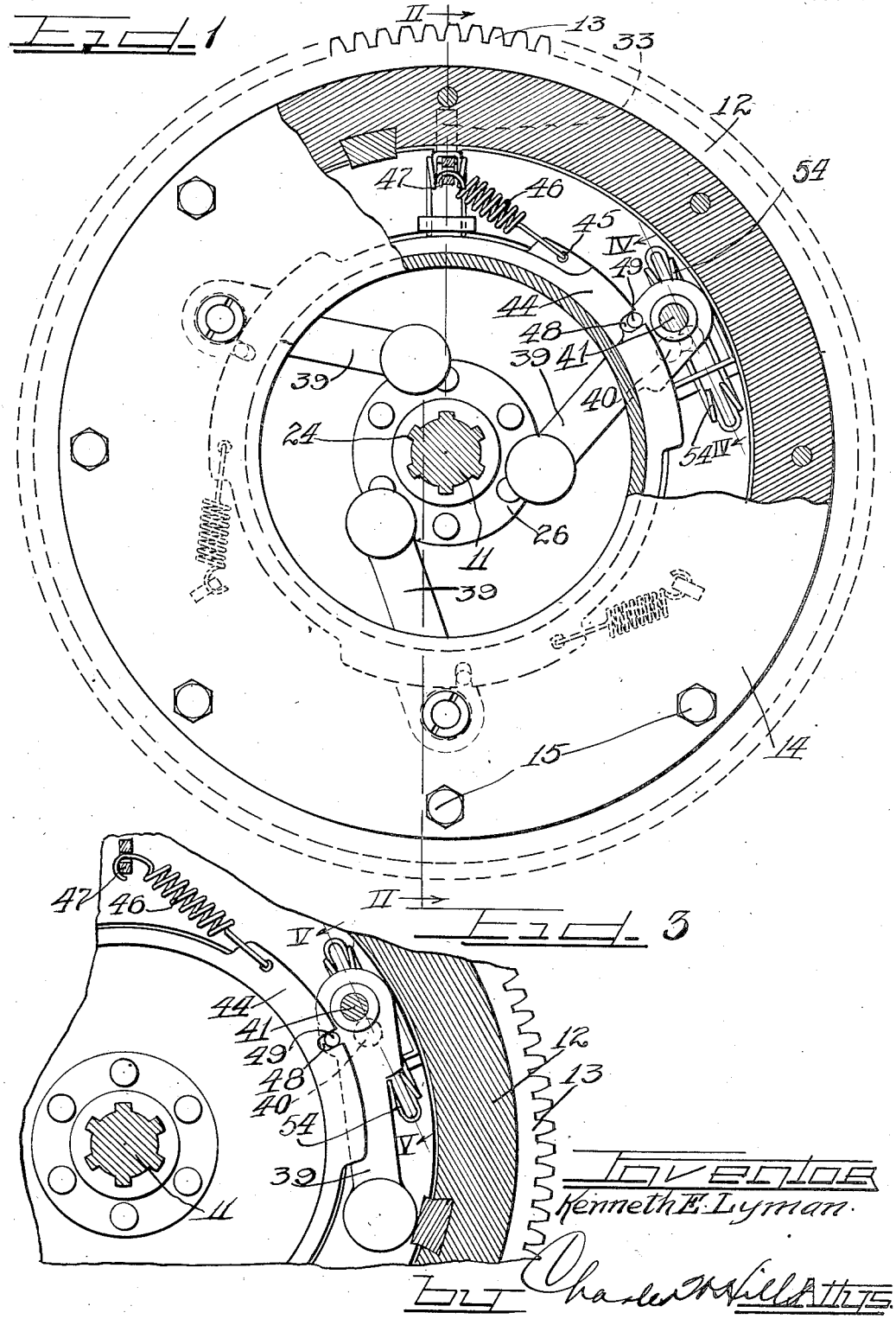

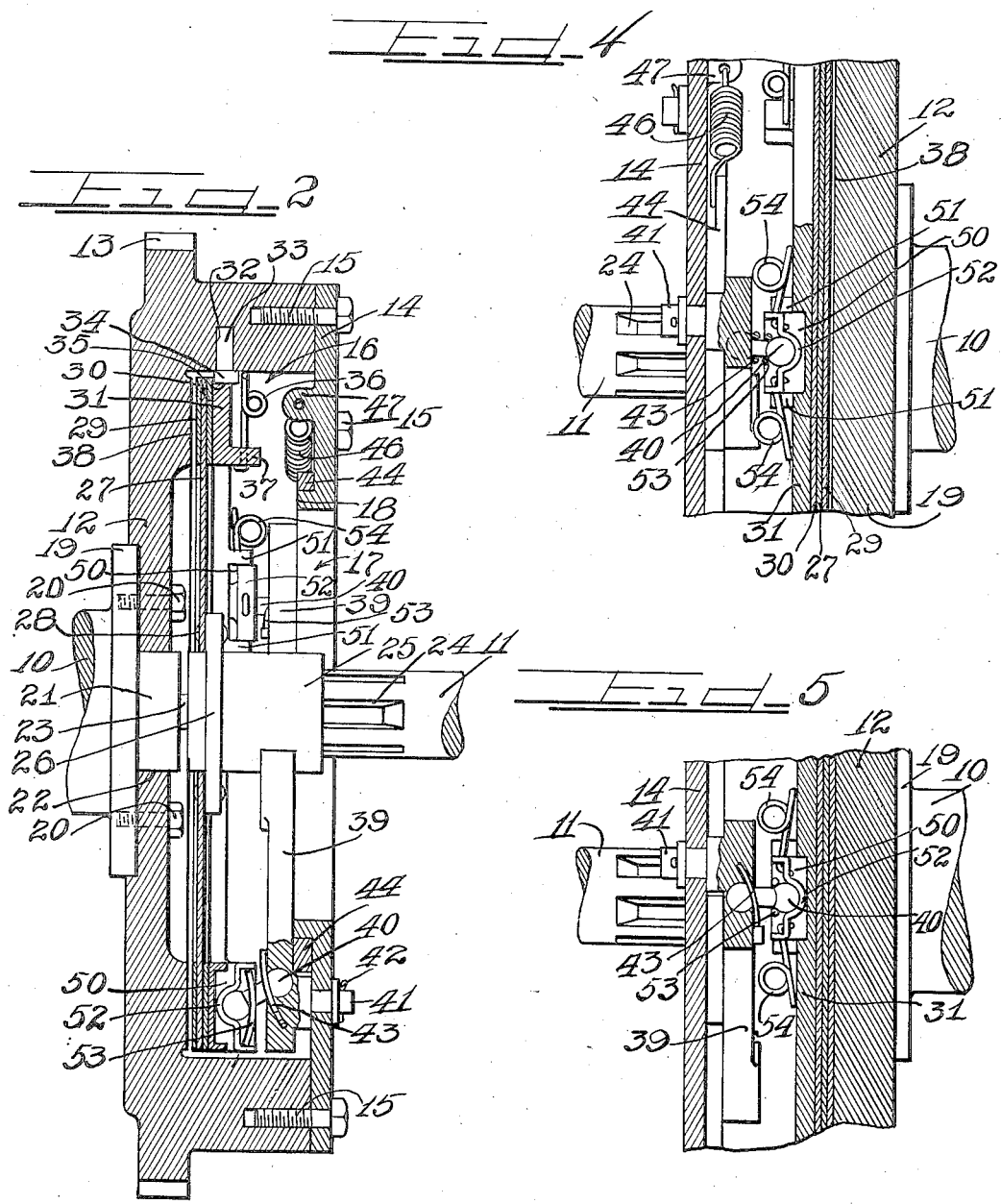

2,029,538

UNITED STATES PATENT OFFICE 2,029,538

AUTOMATIC CLUTCH

Kenneth E. Lyman, Lake Forest, Ill.

Application August 30, 1933, Serial No. 687,434

10 Claims. (Cl. 192—105)

The present invention relates in general to power transmissions and has particular reference to an improvement in automatic clutches which finds special utility in connection with the transmission of power in automobiles or other such machines where it becomes desirable to provide means for disconnecting the drive in a power shaft.

In order to explain the construction, operation and advantages of my invention the same will be referred to in its connection with an automobile but this must not be considered as the limit of its use.

The primary object of the invention is to provide an automatic clutch mechanism which will be positive and reliable in use, which may be manufactured on an economical cost basis and which will contain as few parts as possible without sacrificing efficient operation in use.

While the foregoing briefly explains the nature of the present improvements, other objects and advantages not herein specifically referred to will be readily appreciated upon a full comprehension of the novel features presented in the construction, arrangement and manner of operation of the clutch.

In order that the invention may be readily understood, an embodiment of the same is set forth in the accompanying drawings, and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings:

Figure 1 is a view in end elevation and partly in section of a clutch mechanism constructed in accordance with my invention.

Figure 2 is a view in section on the line II—II, Fig. 1.

Figure 3 is an enlarged detailed view of that part of the mechanism containing the centrifugally responsive control and the parts immediately associated therewith.

Figure 4 is a detailed view in section on the line IV—IV, Fig. 1.

Figure 5 is a detailed view in section on the line V—V, Fig. 3.

Referring now to the drawings in detail: 10 represents a driving shaft and 11 a driven shaft which is adapted to be connected in driving relationship with the driving shaft through means of the clutch mechanism. In its preferred form the mechanism has been designed especially for use in combination with a flywheel 12 which is commonly used as a balancing medium with power shafts of internal combustion engines, such as is employed in automobile assemblies. Any suitable drum or its equivalent may take the place of the flywheel 12 without sacrificing any advantages of my invention.

Since an ordinary flywheel 12 has been selected for illustration, it is appropriate to show the gear teeth 13 on the same, which are used for connecting the self-starter. For the most part the mechanism of the clutch is inclosed within the flywheel 12 by a cover plate 14 which is secured to the flywheel by means of bolts 15 or other means suitable for the purpose. The cover plate 14 cooperating with the flywheel provides an inclosed interior 16 for accommodating the clutch mechanism. The cover plate 14 has a relatively large central opening 17 through which the driven shaft 11 extends into the flywheel. The dimension of this opening 17 is merely a matter of selection and for the purpose which will be hereinafter described, it is bounded by an inwardly turned flange 18.

The driving shaft 10 is made with an attaching flange 19 which is secured to the front face of the flywheel by means of bolts 20 or other means suitable for the purpose. The reduced end 21 on the shaft 10 in advance of the flange 19 projects through a bearing opening 22 in the flywheel so as to terminate the driving shaft 10 within the flywheel.

The driven shaft 11 is made with a pilot 23 which is accommodated within an internal axial bore in the reduced diameter 21 of the driving shaft. Although it is not shown, a suitable antifriction bearing is provided so that the pilot 23 of the driven shaft is supported within the axial bore, above mentioned, with freedom of relative rotation.

Slidably mounted on the splined area 24 of the driven shaft 11 is a sleeve 25 which has a radial flange 26 inset from the end thereof providing an attaching means for the driven clutching element. This clutching element preferably comprises a sheet metal plate 27 which is secured to the flange 26 by rivets or the like 28. The plate 27 is preferably circular and is backed on one side by friction material 29 and on its opposite side by similar material 30. These two pieces of friction material are ring shaped, as there is no necessity of making the same cover all of the surface of the plate 27.

The friction material 30 on one side of the plate 27 is interposed between the plate and a pressure ring 31. Said pressure ring 31 is fixed to rotate with the flywheel 12. For this purpose, it is fixed against relative rotation or movement by any means suitable for the purpose such, for instance, as by providing spaced openings as at 32 to accommodate pins 33, the heads 34 of which are seated in slots 35 made to accommodate them in the periphery of the pressure ring 31. Tension springs 36 are provided in each instance for maintaining the heads of the pins in the slots 35. The springs in this connection have one end bearing against the pin heads with the opposite ends of the springs anchored in ears 37 which project from the face of the ring.

The inside face of the flywheel is made with a ring like abutment 38, against which the friction material 29 will bear when a thrust is imparted to the pressure ring 31 so as to clamp the driven clutching element and cause it to rotate with the flywheel.

The object sought to be accomplished is to provide means for automatically imparting or transmitting a forward thrust to the pressure ring 31 so as to clamp the driving element of the clutch with the driven element, causing them to rotate together and in this way impart a drive between the driving and driven shaft 10 and 11, respectively. I prefer to accomplish this operation by means of a centrifugally responsive device or devices, preferably the weighted arms 39. The arms are so mounted as to respond to centrifugal force developed by the speed of the driving shaft in the flywheel so that they swing outwardly from the center and in swinging outwardly from the center impart a forward thrust to the pressure ring 31.

In order that the weighted arms may be made comparatively small and at the same time develop the required positive thrust on the pressure ring, it is necessary to make an unusually effective connection between the arms and the pressure ring. At the same time it is also highly desirable to make this connection from a part or parts which may be economically manufactured, simple in construction and unusually durable in use. This, of course, also applies to the other parts of the mechanism but it is perhaps more difficult to provide a thrust imparting connection which will include all these desirable characteristics than it is to provide for the other parts of the assembly with the same end in view.

Taking into account these requisites, I prefer to use a double headed pin 40 or a plurality of pins, one for each arm. Since such pins may be made on an automatic screw machine, they can be turned out in quantity lots on a reasonable cost basis and yet be most effective in performing their intended use.

A double ball head on each pin makes the pins equipped for universal movement, which is important because they really serve as connecting links and must be mounted for universal movement when moved by the arms as the arms are moved outward or inward in responding to the speed of the driving shaft.

Each of the arms 39 is pivotally mounted in the cover plate 14 by means of trunnions 41 which project from the side of the anchored ends of the arms and extend through openings in the cover plate 14; cotter pins or the like 42 preventing their withdrawal from the openings. The anchored ends of the arms in this respect are made with an enlarged area and in the face of each arm, opposite the trunnions 41, are sockets or pockets which accommodate the balls on similar ends of the pins 40. A hairpin spring 43 straddles each of the pins and one end of the spring is anchored in diagonal recesses in the ends of the arms with the opposite ends of the springs after they straddle the pins bearing against the side of the arms. This provides a suitable retainer for holding the pins in the sockets or pockets provided in the arms.

Encircling the inwardly presented flange 18 on the cover plate 14 is a floating ring member 44 which is made with increased widths at spaced intervals and each of these increased widths in the ring is provided with an opening 45 for anchoring one end of each of the coil springs 46. The opposite ends of the springs are anchored to ears 47 which are formed on the inside face of the cover plate 14. Also provided in the floating ring 44 are slots 48 which are made to receive pins 49 on the arms 39.

Now, as the arms 39 swing outwardly in response to centrifugal force the pins 49 provide cranks which rotate the floating ring 44 against the resistance of the springs 46. When the tension of the springs 46 is greater than the centrifugal force of the arms, the springs will naturally rotate the floating ring 44 in an opposite direction and thus direct the arms inwardly. In other words, the arms 39 operate against the resistance of the coil springs 46.

The pressure ring 31 is made with pockets, depressions or the like 50 having opposed bifurcated ears or studs 51 at the edges thereof and the pockets are adapted to receive pressed metal cups 52 which accommodate the opposite ball ends of the pins 40 and provide thrust bearings therefor. The pins are confined in these cups by hairpin springs 53 in very much the same manner as by the hairpin springs 43 above referred to, the springs 53 straddling the pins with the ends of the springs anchored in the cups 52. The cups 52 are mounted for limited movement within the pockets 50 under the influence of springs 54. The springs 54 bear against the face of the pressure ring 31 and extend between the bifurcations of the studs 51, with their ends anchored in the cups or pockets 52. One of these springs is provided on each of opposite sides of each of the cups 52.

From the above description it should be perfectly obvious that when the weights swing outwardly, the ball headed connecting pins will straighten out and impart a decided effective thrust to the pressure ring 31 and thus automatically engage the clutch. When the weights move inwardly, the thrust on the pressure ring 31 will be relieved and will throw out the clutch, the operation in this connection being wholly automatic.

The cups 52 and the spring mountings therefor provide self-adjusting thrust bearings, so to speak, for the centrifugally actuated thrust imparting or pressure exerting members represented by the pins 40.

When the friction material of the clutch elements is unworn, the springs 54 will flex when the centrifugal weights move outwardly to move the thrust imparting members forwardly in the direction of the thrust. As the friction material becomes worn, the pressure of the springs 54 will compensate for this wear. The springs further provide yieldably mounted thrust bearings, so to speak, for the pins or the thrust imparting members and serve to automatically adjust the mechanism to compensate for wear on the friction material of the clutch elements. In this way I thus provided an automatic adjustment for the clutch.

I claim as my invention:

1. In a clutch, driving and driven power transmitting members, a clutching element contributing to a releasable driving connection between said members, a centrifugal device for controlling said clutching element, a thrust imparting member mounted for universal wabbling movement between the centrifugal device and said clutching element and a mounting for said member yieldable in the direction of the thrust imparted thereby.

2. In a clutch, driving and driven power transmitting members, a clutching element contributing to a releasable driving connection between said members, a centrifugal device for controlling said clutching element, a member mounted for universal wabbling movement through which the control is transmitted from the centrifugal device to said clutching element and a mounting for said member yieldable in the direction of the thrust imparted thereby.

3. In a clutch, driving and driven power transmitting members, a clutching element contributing to a releasable driving connection between said members, a centrifugal device for controlling said clutching element, a ball ended pin-like thrust imparting member between the centrifugal device and said clutching element and a mounting for said member yieldable in the direction of the thrust imparted thereby.

4. In a clutch, driving and driven power transmitting members, a clutching element contributing to a releasable driving connection between said members, a centrifugal device for controlling said clutching element, a ball ended pin-like thrust imparting member mounted for universal movement between the centrifugal device and said clutching element and a mounting for said member yieldable in the direction of the thrust imparted thereby.

5. In a clutch, driving and driven power transmitting members, a clutching element contributing to a releasable driving connection between said members, a centrifugal device for controlling said clutching element and a thrust imparting connection between the centrifugal device and said clutching element, comprising a ball ended pin-like member and a thrust bearing for said member yieldable in the direction of the thrust imparted thereby.

6. In a clutch, driving and driven power transmitting members, a clutching element contributing to a releasable driving connection between said members, a centrifugal device for controlling said clutching element and a thrust imparting connection between the centrifugal device and said clutching element, comprising a pin-like thrust imparting member having ball ends, a thrust bearing for one end of said member yieldable in the direction of the thrust imparted by said member and a universal bearing for the opposite end of said member.

7. In a clutch, driving and driven power transmitting members, a clutching element contributing to a releasable driving connection between said members, a centrifugal device for controlling said clutching element and a thrust imparting connection between the centrifugal device and said clutching element, comprising a pin-like thrust imparting member having ball ends, a thrust bearing in which one end of said member is mounted for universal movement, a yieldable mounting for said thrust bearing and a universal bearing for the opposite end of said member.

8. In a clutch, driving and driven power transmitting members, a clutching element contributing to a releasable driving connection between said members, a centrifugal device for controlling said clutching element and a thrust imparting connection between the centrifugal device and said clutching element, comprising a pin-like thrust imparting member having ball ends and a mounting for said member yieldable in the direction of the thrust imparted thereby.

9. In a centrifugally controlled friction clutch, an axially shiftable clutching element, a centrifugal device and thrust imparting means between said device and said clutching element yieldable in the direction of the thrust imparted thereby, said centrifugal device comprising a plurality of weighted arms mounted to swing inwardly and outwardly in synchronism, resilient means for resisting the outward movement of said arms, said thrust imparting means comprising a plurality of pin-like members, a mounting on each of said arms and for said pin-like members and yieldably mounted thrust bearings on the clutching element for the opposite ends of said pin-like members.

10. In an automatically controlled friction clutch, an axially shiftable clutching element and means for shifting said element, comprising a plurality of ball ended pin-like members, thrust bearings on the clutching element yieldable in the direction of the thrust imparted by said pins and mounted to receive one end of the pins, a plurality of weighted centrifugal arms, means for connecting said pin-like members to said arms for universal movement, means for mounting said arms to swing inwardly and outwardly in synchronism, and resilient means for resisting the outward movement of said arms, comprising a floating ring member, springs connected with said member to resist its rotation in one direction and pins on said weighted centrifugal arms engaging slots in said ring member; whereby the outward movement of said arms, when responding to centrifugal force, will rotate the ring member against the resistance of the springs and cause the springs to move the arms inwardly when the resistance of the springs is greater than the centrifugal force of the arms.

KENNETH E. LYMAN.